United States Patent [19]

Liedenbaum et al.

[11] Patent Number: 5,719,614
[45] Date of Patent: Feb. 17, 1998

[54] OPTICAL READING AND RECORDING DEVICE CONTAINING A RADIATION SOURCE WHICH HAS A SUBSTANTIALLY CONSTANT MEAN HEAT DISSIPATION DURING READING AND RECORDING

[75] Inventors: Coen T.H.F. Liedenbaum; Bernardus A.J. Jacobs, both of Eindhoven, Netherlands

[73] Assignee: U.S. Phillips Corporation, New York, N.Y.

[21] Appl. No.: 579,085

[22] Filed: Nov. 21, 1995

Related U.S. Application Data

[63] Continuation of Ser. No. 201,606, Feb. 25, 1994, abandoned.

[30] Foreign Application Priority Data

Mar. 8, 1993 [EP] European Pat. Off. ............... 93200648

[51] Int. Cl.⁶ .................... B41J 2/47; B41J 4/435; G01D 15/14
[52] U.S. Cl. .................... 347/247; 347/225; 347/240
[58] Field of Search .................... 347/248, 249, 347/225, 251, 240, 247; 358/296

[56] References Cited

U.S. PATENT DOCUMENTS

| | | | |
|---|---|---|---|
| 4,464,714 | 8/1984 | Huijser et al. | 341/102 |
| 4,473,829 | 9/1984 | Immink et al. | 347/264 |
| 4,774,522 | 9/1988 | Van Tongeren et al. | 347/225 |

FOREIGN PATENT DOCUMENTS

| | | |
|---|---|---|
| 0147090 | 7/1985 | European Pat. Off. . |
| 0154389 | 9/1985 | European Pat. Off. . |
| 0288114 | 10/1988 | European Pat. Off. . |
| 0321027 | 6/1989 | European Pat. Off. . |
| 3001334 | 1/1991 | Japan . |
| 2148670 | 5/1985 | United Kingdom . |

*Primary Examiner*—Benjamin R. Fuller
*Assistant Examiner*—Raquel Yvette Gordon
*Attorney, Agent, or Firm*—Michael E. Belk

[57] ABSTRACT

A radiation beam is generated by a radiation source such as a laser. An optical system focuses the radiation beam at a recording layer (in a disc-shaped carrier) of a type in which an optically detectable change is caused to take place if the recording layer is heated to above a write temperature. The recording layer is scanned by the radiation beam by means of a motor. A control circuit feeds the radiation source with electric power which is converted in the radiation source partly into heat and partly into radiation for the radiation beam. The control circuit operates in a read mode in which the power supplied to the radiation source has a value at which the rise in temperature of the recording layer caused by the radiation beam is insufficient to cause an optically detectable change to take place. The control circuit also operates in a write mode in which the radiation source is intermittently fed with power pulses having a strength at which the rise in temperature of the recording layer caused by the radiation beam is sufficiently large to cause an optically detectable change to take place. The power pulses generated in the write mode have a strength and a duration for which the corresponding mean heat dissipation in the radiation source is substantially equal to the mean heat dissipation in the radiation soure in the read mode. As a result, the wavelengths of the generated radiation in the read mode and write mode are equal, thereby avoiding problems with a wavelength dispersion in the optical path of the optical system.

15 Claims, 2 Drawing Sheets

OPTICAL READING AND RECORDING DEVICE CONTAINING A RADIATION SOURCE WHICH HAS A SUBSTANTIALLY CONSTANT MEAN HEAT DISSIPATION DURING READING AND RECORDING

This is a continuation of prior application Ser. No. 08/201,606, filed on Feb. 25, 1994, now abandoned.

BACKGROUND OF THE INVENTION

The invention relates to an optical recording and reading device comprising a radiation source for generating a radiation beam having an intensity which depends on the power applied to the radiation source; an optical system for focusing the radiation beam at a recording layer of a type in which an optically detectable change is caused to take place if the recording layer is heated to above a write temperature; a scanning device for causing the radiation beam to scan the recording layer for the purpose of recording and reading; and a control circuit for supplying power to the radiation source, the control circuit in a first state of operation supplying power to the radiation source to a value at which the rise in temperature of the recording layer caused by the radiation beam is insufficient to cause the optically detectable change to take place, and the control circuit in a second state of operation intermittently supplying the radiation source with power pulses which have a strength for which the rise in temperature of the recording layer caused by the radiation beam is sufficiently large to cause the optically detectable changes to take place.

Such a device is known, for example, from EP-A-0.321.027, to which U.S. Pat. No. 5,126,985 corresponds.

A problem that occurs in the prior-art device is that the wavelength of the generated radiation beam is different for different states of operation. This may lead to problems with wavelength dispersion in the optical path of the optical system. After all, the behavior of the optical system depends on the wavelength. For example, the distance from the focal point to the focal objective depends on the wavelength of the radiation. A change from one state of operation to the other thus leads to a shift of the focal point.

SUMMARY OF THE INVENTION

It is an object of the invention to provide a device in which the wavelength difference of the radiation is smaller for the various states of operation.

According to the invention this object is achieved by the control circuit being arranged for generating in a second state of operation power pulses which have a strength and duration for which the corresponding mean heat dissipation in the radiation source is substantially equal to the mean heat dissipation in the first state of operation.

The invention is based on the recognition that the shift of wavelengths for the various states of operation is caused by differences in the mean heat dissipation in the radiation source, also termed thermal load of the laser in the first and second states of operation. The invention is further based on the recognition that the necessary energy contents of a radiation pulse for causing the optically detectable change to take place diminishes when the time interval in which the energy is applied is reduced. As a result, it is possible to select the radiation power of the radiation pulse and a duration of the radiation pulse at which the mean power loads in the various states of operation are equal.

BRIEF DESCRIPTION OF THE DRAWINGS

The invention will be further explained with reference to the drawings, in which.

DESCRIPTION OF THE PREFERRED EMBODIMENT

Figure 1:
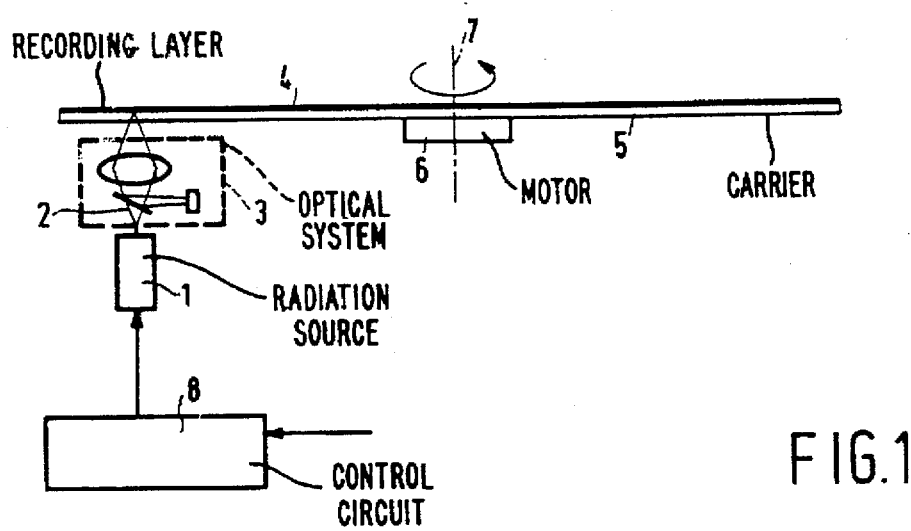
FIG. 1 shows an embodiment of a device according to the invention.

FIG. 1 shows an embodiment of an optical recording and reading device according to the invention. Reference character 1 denotes a radiation source in the form of a semiconductor laser of a customary type for generating a radiation beam 2. The radiation beam is focused at a recording layer 4 in a customary fashion with the aid of an optical system 3, which layer is realized, for example, on a disc-shaped carrier 5. The recording layer 4 is of a type in which an optically detectable change is caused to take place if the recording layer is heated to above a write temperature. Such a layer may be, for example, what is commonly referred to as a magneto-optical layer in which, as a result of the heating of the layer, the direction of magnetization of the layer can be changed with the aid of a relatively weak magnetic field. The recording layer may also be what is commonly referred to as phase-change layer in which the condition of the layer can be changed from amorphous to crystalline or vice versa as a result of heating. Nevertheless, other different types of recording layers are also suitable.

For effecting a scanning of the recording layer by the radiation beam 2, the disc-shaped carrier 5 is moved relative to the optical system 3 by a drive motor 6, which makes the carrier 5 rotate around an axis 7. The laser 1 is fed by a control circuit 8, which may be brought to a first state of operation in a customary fashion in which state the control circuit 8 supplies electric power to the laser 1, such that the intensity of the radiation beam 2 is insufficient to heat the recording layer 4 to above the write temperature. Customarily, the control circuit is brought to this state of operation during the reading of information from the scanned portion of the recording layer 4. This state of operation will be referred to as the read mode hereinafter.

The control circuit 8 may further be brought to a second state of operation in a customary fashion in which the laser is supplied with power pulses which cause radiation pulses to be generated by the laser 1, the energy content of the radiation pulses being sufficient to heat the recording layer 4 to above the write temperature. Customarily, the control circuit is brought to the second state of operation during the recording of information. This state of operation will be referred to as the write mode hereinafter.

The duration of time and the power of the radiation pulses in the write mode and the power of the radiation beam in the read mode are adjusted with respect to each other so that the mean heat dissipation in the write mode and the mean heat dissipation in the read mode are substantially equal. The manner in which these adjustments can be made and the advantage of such an adjustment will be further described in detail hereinafter.

The amount of energy necessary for heating the recording layer to above the write temperature (i.e., the "necessary energy") strongly depends on the length of the time interval used to heat the recording layer (=length of the radiation pulse). The necessary energy diminishes as the length of the radiation pulses is reduced. This is caused by the fact that the influence of the heat diffusion on the temperature of the recording layer with short radiation pulses is smaller than with long radiation pulses. After all, the amount of heat diffused when the write temperature is reached is smaller with short radiation pulses than with long radiation pulses.

Figure 2:
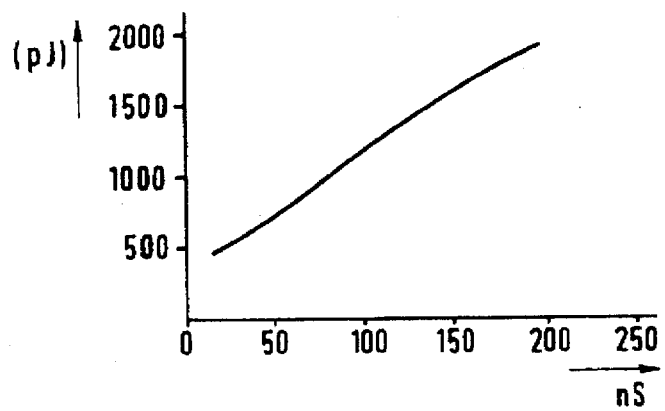
FIG. 2 shows the necessary energy contents of a radiation pulse plotted against pulse duration.

By way of illustration, FIG. 2 shows the necessary energy plotted against the duration of a radiation pulse for a specific record carrier having a recording layer. As can be seen in FIG. 2, with a pulse duration of 25 ns, a pulse having an energy content of the order of 500 pJ is sufficient to heat the recording layer of the record carrier to above the write temperature, whereas the energy content required for a pulse duration of 100 ns is 1250 pJ.

Only a minor portion of the electric power supplied to the laser 1 is converted into radiation. The other part of the supplied power is converted into heat. This means that the heat dissipation (thermal load) in the laser strongly depends on the selected duration of the radiation pulse.

The wavelength of the radiation generated by the laser 1 depends on the temperature of the laser 1. The temperature of the laser 1 is substantially determined by the mean thermal load of the laser in the preceding time interval. In the device according to the invention, values are selected for the length of the radiation pulse and the intensity of the radiation power of the radiation pulse for which the mean thermal load in the write mode is equal to the mean thermal load in the read mode.

Figure 3:
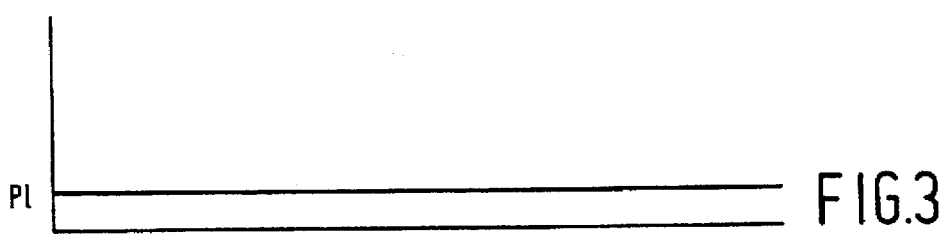
FIGS. 3 and 4 show the heat dissipation plotted against time for the various states of operation.

FIG. 3 shows by way of illustration the dissipated laser power plotted against time for the case where the laser is fed with a constant electric power by the control circuit 8 in the read mode.

Figure 4:

FIG. 4 shows an example of the behavior of the dissipated power in the write mode. The power dissipated while the radiation pulses were generated, as shown in FIG. 4, is four times the continuously dissipated power as shown in FIG. 3. The duty cycle of the radiation pulses in the write mode is equal to 1:4, which is understood to denote that the mean dissipated power for the situations represented in FIGS. 3 and 4 is the same.

Figure 5:
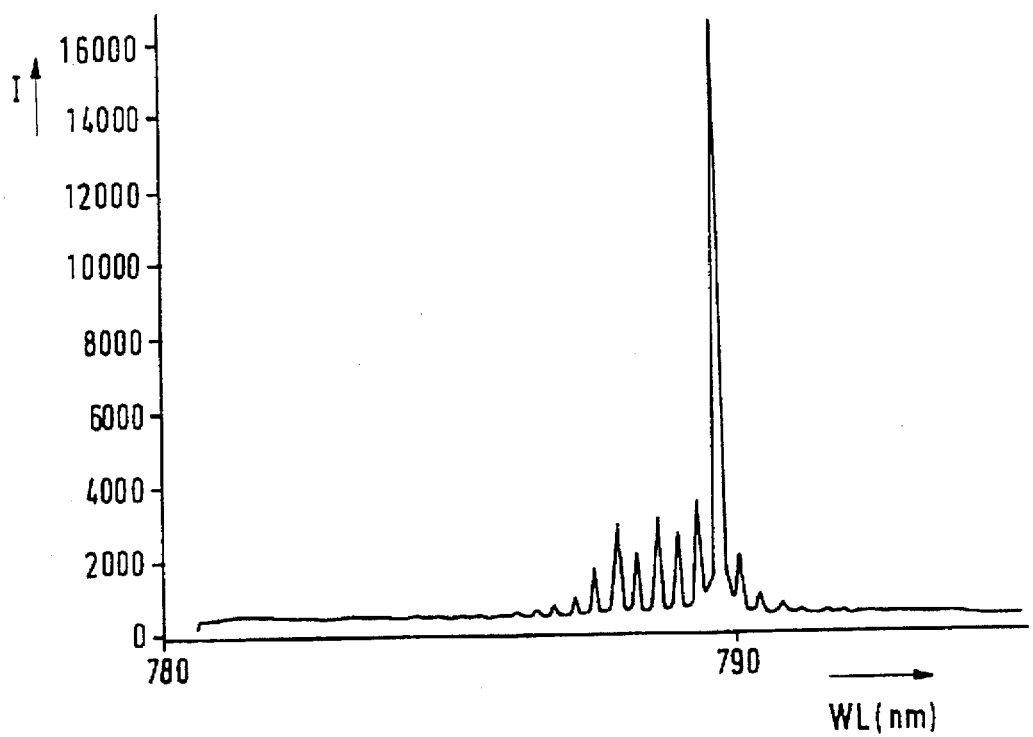
FIGS. 5 and 6 show the spectra of the radiation beam for the various states of operation.
Figure 6:
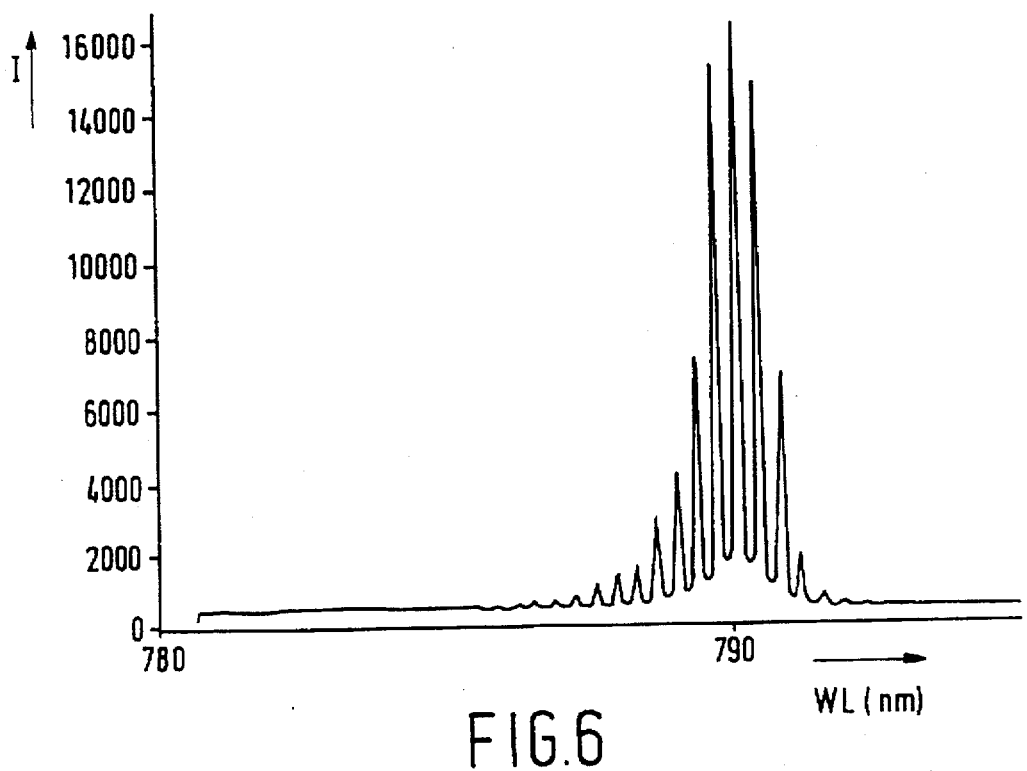

In FIG. 5 the spectrum of the generated radiation is shown for the situation represented in FIG. 3, whereas FIG. 6 shows the spectrum of the generated radiation for the situation shown in FIG. 4. The central wavelength is the same for both spectra.

FIG. 4 shows the situation in which the duty cycle of the radiation pulses is constant. Such a situation occurs, for example, in a magneto-optical recording device in which magnetic domains are recorded by scanning the recording layer with a pulsating radiation beam with a constant duty cycle and, simultaneously, bringing the recording layer under the influence of a modulated magnetic field. Such a magneto-optical recording device is described in detail in EP-A-0.321.027 and its corresponding U.S. patent (i.e., U.S. Pat. No. 5,126,985), which are incorporated herein by reference.

From the number of radiation pulses that are to be generated per unit of time, a determination can be made as to how large the energy content of each radiation pulse is to be to ensure that the thermal load in the write mode is made equal to that in the read mode. Given the desired energy content of the radiation pulses, the length and the power of a radiation pulse energy content can be determined with which the recording layer is heated to above the write temperature.

In the embodiment shown in FIG. 4, the power level within each power pulse remains constant. However, it should be observed that the behavior of the power within the pulses may also be different, for example, sinusoidal or triangular. Nevertheless, it is essential that within a relatively short period of time the required amount of energy be supplied to the recording layer. The behavior of the power within the pulses is then non-essential.

It will further be evident to those skilled in the art that the invention is not restricted to recording devices for which the duty cycle of the radiation pulses is constant in the write mode. It is only essential for the mean thermal load to have a constant value. The latter is also the case when signals are recorded while the mean number of radiation pulses per time unit is constant. This is the case, for example, when d.c.-free signals are recorded, such as, for example, EFM-modulated signals. Recording devices for recording EFM-modulated signals are described in detail, for example, in EP-A-0.288.114 and U.S. Pat. No. 4,473,829, which documents are incorporated herein by reference.

The mean number of radiation pulses per unit of time is also constant for recording what is commonly referred to as differentially encoded signals. Such differentially encoded signals are formed by binary code words of constant length and having a constant number of bits with a logic value "1". Known differential codes are, for example, what is commonly referred to as FOOF code (Four Out Of Fifteen) and what is commonly referred to as TOON code (Two Out Of Nine). When a code word is recorded, a fixed number of radiation pulses is generated. For a detailed description of such codes and devices for recording these codes, reference is made to U.S. Pat. No. 4,464,714, GB-2.148.670, EP-A-0.147.090 and EP-A-0.154.389, which documents are incorporated herein by reference.

In the applications of the invention mentioned hereinbefore, the number of generated radiation pulses per time unit is constant on average. In that case, the energy content of each radiation pulse is the same. However, the invention can also be applied to the recording of information signals for which the number of generated radiation pulses is not constant on average. When such signals are recorded, a mean constant thermal load can be obtained by adjusting the energy content of the radiation pulses in response to the thermal load in the preceding time interval. Alternatively, it is possible to adjust the radiation power of the radiation beam in the time intervals between the radiation pulses in response to the thermal load of the preceding time interval.

It has appeared that for causing an equal thermal load to occur in both the write and read modes, radiation pulses are to have a relatively high power and short duration (of the order of 10 ns). The use of such short radiation pulses has advantages as will be further explained hereinafter.

Since the required amount of energy applied to the recording layer per radiation pulse strongly diminishes when the pulse duration is shortened, there is less trouble with the heating of the recording layer by preceding radiation pulses when short radiation pulses are generated. As a result of such a heating process, the final temperature at the end of the radiation pulse realized is not the same for each radiation pulse, which leads to differences in size of the area in which the optically detectable change is caused by a radiation pulse. For a detailed description of this heating effect reference is made to U.S. Pat. No. 4,774,522.

A shortening of the radiation pulses likewise causes the temperature gradient in the recording layer at the end of the radiation pulse to be larger, which means that the edges of the area in which the optically detectable change has taken place are better defined. This leads to a reduction of jitter in the read-out signal when the recorded information is read out.

In the embodiments described hereinbefore a laser is used as a radiation source. However, it will be obvious to those skilled in the art that the invention may also be applied to different types of radiation sources, in which the wavelength of the generated radiation is determined by the mean thermal load of the radiation source.

We claim:

1. An optical reading and recording device, comprising:

a radiation source for generating a radiation beam having a controllable intensity;

an optical system for focusing the radiation beam at a recording layer;

scanning means for causing the radiation beam to scan the recording layer for reading and recording in the recording layer; and a control circuit for supplying power to the radiation source to control the intensity of the radiation beam, the control circuit operating in (a) a first state of operation for reading the recording layer in which the power supplied to the radiation source is such that the intensity of the radiation beam is insufficient to heat the recording layer above a temperature in which an optically detectable change takes place, and (b) a second state of operation for recording in the recording layer in which the power supplied to the radiation source is as series of intermittently supplied power pulses which cause the radiation source to produce a radiation beam including corresponding radiation pulses which each have an energy content which is sufficient to heat the recording layer above a temperature in which an optically detectable change takes place, wherein the control circuit ensures that the power pulses have a strength and duration such that the radiation source has a mean heat dissipation which is substantially equal during both reading and recording.

2. The device as claimed in claim 1, wherein during recording, the radiation pulses have a constant duty cycle.

3. The device as claimed in claim 1, wherein during recording, an average number of the radiation pulses per a unit of time is constant.

4. The device as claimed in claim 3, wherein during recording, the energy content of the radiation pulses is substantially constant.

5. The device as claimed in claim 1, wherein during recording, an average number of the radiation pulses per a unit of time varies.

6. The device as claimed in claim 5, wherein during recording, the energy content of the radiation pulses varies.

7. The device as claimed in claim 5, wherein during recording, the energy content of the radiation pulses is adjusted in response to heat dissipation in the radiation source during a respective preceding time interval.

8. The device as claimed in claim 5, wherein the intensity of the radiation beam in between radiation pulses varies.

9. The device as claimed in claim 5, wherein during recording, the intensity of the radiation beam in between radiation pulses is adjusted in response to heat dissipation in the radiation source during a respective preceding time interval.

10. The device as claimed in claim 1, wherein during recording, the strength of the power pulses is constant.

11. The device as claimed in claim 1, wherein during recording, the strength of one of the power pulses varies during that pulse.

12. The device as claimed in claim 1, wherein during recording, the strength of the power pulses varies.

13. The device as claimed in claim 1, wherein the radiation beam has a wavelength which varies as temperature of the radiation source varies, and the control circuit operates to ensure that the wavelength of the radiation beam is substantially the same during both reading and recording.

14. The device as claimed in claim 1, wherein the radiation pulses have a high intensity and a short duration.

15. The device as claimed in claim 14, wherein the radiation pulses have a duration of the order of 10 ns.

* * * * *